June 10, 1969     D. R. RHODES     3,449,169
PLATINUM PHOSPHIDE FUEL CELL AND METHOD OF PREPARATION
Filed Dec. 28, 1965
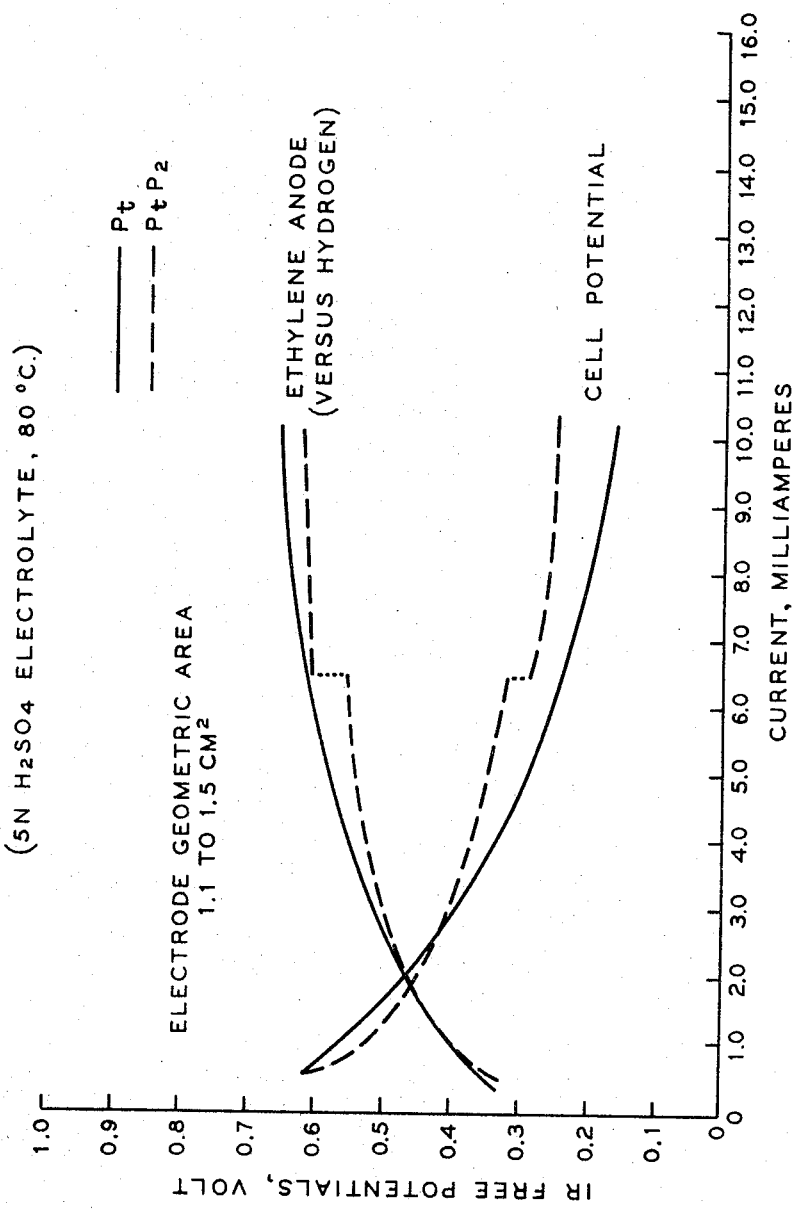
INVENTOR
DAVID R. RHODES
BY
ATTORNEYS

United States Patent Office 3,449,169
Patented June 10, 1969

3,449,169
PLATINUM PHOSPHIDE FUEL CELL AND METHOD OF PREPARATION
David R. Rhodes, Novato, Calif., assignor to Chevron Research Company, San Francisco, Calif., a corporation of Delaware
Filed Dec. 28, 1965, Ser. No. 516,917
Int. Cl. H01m 27/10
U.S. Cl. 136—86  3 Claims

ABSTRACT OF THE DISCLOSURE

Fuel cells employing platinum phosphide as electrocatalyst and a novel method for preparing high surface area platinum phosphide for use as the electrocatalyst.

---

This invention concerns novel fuel cell electrodes comprising platinum phosphide and a novel method for preparing "high area" platinum phosphide.

The numerous advantages of fuel cells over other portable sources of power has encouraged extensive research to provide practicable fuel cells. An attractive group of fuels are the aliphatic hydrocarbons and alcohols, such as ethylene and methanol. However, in order to be able to use these fuels, the anodic electrode or working electrode has been restricted to the noble metals, particularly platinum. The high cost and relative unavailability of platinum have been significant deterrents to a practicable commercial fuel cell. Therefore, efforts have been made to find materials as alternatives to the noble metals or diluents of the noble metals without concomitant loss in power.

It has now been found that platinum phosphide, a composition of platinum and phosphorus having the approximate formula $PtP_2$, particularly when prepared to provide a high surface area, provides a compositions which is effective as an electrocatalyst for the anodic oxidation of hydrogen, hydrazine, methanol, ethylene and ethane, as well as the cathodic reduction of oxygen. The electrode can be used with both acidic and basic electrolytes. Preferably, an acidic electrolyte will be used with the hydrocarbons and methanol.

The figure is a graph of the variation of anodic current with change in anode potential using ethylene as fuel.

The high surface area platinum phosphide prepared as described subsequently is formed as crystals of a size in the range of from about 100 to 2000 A. as determined by electron microscopy. The surface area as determined by a krypton adsorption apparatus is about $0.24 \text{ m.}^2/\text{g.} \pm 20\%$. (Chemisorption measurements show that CO can adsorb to the extent of $0.2$–$0.05 \times 10^{15}$ CO atoms/cm.² of platinum phosphide surface area.)

While various methods for preparing platinum phosphide are known in the art, a preferred novel method has been found which provides platinum phosphide having a high surface area. The elements are combined in approximately stoichiometric proportions to give $4AlP$ and $1PtP_2$: $4Al:6P:1Pt$. Preferably, the materials should be in a finely divided form. The materials are mixed in an inert atmosphere and heated at a temperature in the range of 650° to 1000° C., usually 750° to 900° C. for times in the range of 6 to 100 hours, usually in the range of 24 to 72 hours.

The resulting melt is cooled and the aluminum and excess phosphorous (present as AlP) extracted with a strong acid, e.g., sulfuric acid of from 6 to 12 N, in an inert atmosphere. The extraction is carried out at temperatures in the range of about 75° to 135° C., usually 90° to 125° C. for times in the range of 12 to 125 hours, usually 48 to 100 hours. The platinum phosphide which remains is washed free of acid with water and then, if desired, dried.

In order to prepare the platinum phosphide, four moles of aluminum were combined with six moles of red phosphorus and one mole of platinum black (particles of about 50 to 100 A. in size) and the mixture heated at 850° C. for 48 hours in an evacuated sealed quartz ampule. (Precautions should be taken in mixing the various materials, since they may ignite.) After being heated for 48 hours, the material was cooled and transferred from the ampule to a flask containing 8 N sulfuric acid. The mixture was stirred at reflux for about 72 hours in an oxygen-free atmosphere. The platinum phosphide was then washed free of acid with water and dried.

Electrodes from platinum phosphide may be prepared in a similar manner to that used for electrodes from platinum. With the gaseous fuels, electrodes can be prepared as described by L. W. Niedrach et al., J. Electrochem. Soc., 112 117 (1965). The structure of the fuel cell may be varied according to the use to which the fuel cell will be applied. Various structures of fuel cells are reported in the art and the use of platinum phosphide does not limit the type of structure which may be used.

Using platinum phosphide prepared by conventional techniques (stoichiometric amounts of platinum and phosphorus were heated at 850° C. for 48 hours in a sealed evacuated quartz tube), electrodes were prepared by compressing the catalyst material into $\frac{1}{8}'' \times \frac{1}{2}''$ diameter disks at 200,000 lbs. total pressure and mounted in a Teflon holder. Using moist platinum black, comparative platinum electrodes were also prepared in a similar manner.

The electrochemical tests on the above electrodes were carried out in an H-type glass cell. The test electrode compartment was separated from the counter electrode compartment by means of a glass frit. Immersed into the electrode compartment near the test electrode or working electrode was a capillary probe from a saturated Calomel reference electrode. The capillary was filled with the same electrolyte used in the test cell. With liquid fuels, an inert gas, e.g., argon, was allowed to flow over the top of the anolyte, while with gaseous fuel, the fuel was bubbled past the electrode surface immersed in the anolyte.

Determinations were carried out by applying a succession of constant potential steps to the electrode with a Wenking potentiostat. After a 15-minute interval, the current had usually reached a steady value and the data reported were after the 15-minute interval. The following table indicates the results obtained with a number of fuels, using 1 N sulfuric acid for methanol and ethylene and 1 N NaOH for hydrazine as the anolytes at a temperature of 80° C. The anodic current is reported in milliamps as against the anode potential measured as volts vs. Saturated Calomel Electrode (SCE). The methanol was present at 1 molar concentration, and the hydrazine was present at 5 volume percent.

TABLE I

| Anode potential, volt vs. SCE | Electrolyte | Fuel | | | | | |
|---|---|---|---|---|---|---|---|
| | | Methanol | | Ethylene | | Hydrazine | |
| | | Anodic current, milliamps | | | | | |
| | | PtP₂ | Pt | PtP₂ | Pt | PtP₂ | Pt |
| −0.9 | 1 N NaOH | | | | | 21 | 12 |
| −0.8 | 1 N NaOH | | | | | 46 | 42 |
| −0.7 | 1 N NaOH | | | | | 60 | 60 |
| −0.6 | 1 N NaOH | | | | | 75 | 77 |
| −0.5 | 1 N NaOH | | | | | 80 | 75 |
| 0.2 | 1 N H₂SO₄ | 8 | 19 | 1 | 2 | | c |
| 0.3 | 1 N H₂SO₄ | 19 | 33 | 2.5 | 1 | | |
| 0.4 | 1 N H₂SO₄ | 31 | 50 | 3 | <1 | | |
| 0.5 | 1 N H₂SO₄ | 46 | 63 | 5 | <1 | | |

It is evident from the above data that the platinum phosphide electrodes are quite active in oxidizing methanol, ethylene and hydrazine, despite their having significantly smaller amounts of platinum per unit volume than the platinum electrode and much lower surface area.

To further demonstrate the activity of the platinum phosphide as an electrocatalyst, gas diffusion electrodes were prepared. Several 1″ diameter circles were cut from Whatman glass paper (GF/B, about 5 mm. thick). Two of these disks were soaked in a Teflon dispersion of 3.5:1 by volume of water to Du Pont Teflon 30 (60.4 percent solids). These disks were placed on aluminum foil which had previously been inscribed with two 1″ circles. The foil and disks were heated on a hot plate at low heat for 15 minutes and then at high heat for 15 minutes. Two other disks which had not been soaked with a Teflon dispersion, but which are on aluminum foil similar to that above, were also prepared. A very thin paste of electrocatalyst was then spread on all of the disks. This paste was made by slowly adding and mixing 2.8 cc. of Teflon 30 mixture (5 cc. of Teflon 30 diluted to 10 cc. with water) to 1 g. of electrocatalyst (10.7 percent Teflon by weight). The two sets of disks on the two sheets of aluminum foil were heated on a hot plate at low heat for 15 minutes and then for 15 minutes at high heat.

Tantalum gauze (50-mesh, 3-mil diameter wire) was cut into 3.7 cm. diameter disks with 7.5 cm. tabs for electrical connections. A gauze disk was laid on each unsoaked disk covered with catalyst, and a Teflon soaked disk on aluminum foil was placed on each tantalum gauze. This combination was then placed between two 6″ sq. "ferro-type" stainless steel plates which had been lightly dusted with graphite. This sandwich was placed between the heated platens of a hydraulic press and pressed at approximately 2,000 lbs./in. sq. of electrode surface for 2 minutes at 355° C.

After this treatment, the "ferro-type" plates are easily pulled apart. The separation occurs through the glass disks which have not been soaked in Teflon. The glass paper, which remains exposed, is easily flaked off. This leaves on one side of the electrode Teflon and catalyst mixed with a small amount of glass fiber on the tantalum screen. With a little more effort and care, the Teflon saturated disk can be separated from the aluminum foil and "ferro-type" plates. The excess glass and Teflon can easily be scraped from this surface of the electrode leaving on this side a thin layer of glass fiber and catalyst, which is high in Teflon content. This side of the electrode is placed on the gas side in the cell.

In preparing the platinum and platinum phosphide electrodes, efforts were made to use the same amount of paste in the two electrodes.

The cell used employed a central Teflon spacer having a hole in the center for the electrolyte and inlet and exit ports for continued recycling of the electrolyte to an external reservoir. Adjacent to the Teflon spacer were gaskets to prevent leakage, against which were placed the electrodes prepared as described earlier. Pressed against the electrodes were 2 Teflon cylinder having an open section adjacent to the electrodes and inlet and exit ports for the fuel. The outer Teflon cylinders were fitted with the inner spacer, electrodes and gaskets, so as to form a tight seal when pressure was applied to the outer portions of the outer Teflon cylinders. Metal disks were provided which fitted onto a raised portion on the back of the Teflon cylinders and could then be bolted together to maintain a constant pressure against the assembly. The working area of the electrode was found to be about 1.1–1.5 sq. cm. per electrode.

The hydrogen reference electrode was a cell similar to the above except that one of the Teflon cylinders and electrode were replaced with a solid block of Lucite. The reference electrode was connected to the working cell by means of a short piece of Teflon tubing filled with electrolyte.

Excess electrolyte for the system was stored in a 500 ml. reservoir and recycled at a rate of about 1.2 ml. per minute. To obtain the temperature, the cell was placed in a precision oven maintained at the desired temperature and a constant flow of nitrogen maintained through the oven to prevent the buildup of dangerous gases.

The performance of the cell was measured with a modified Kordesch-Marco bridge (J. Electrochem. Soc., 107 480 (1960)) which permits the measurement of open circuit voltage and internal resistance-free cell voltage during the operation of the cell. Current to the cell was measured with a model 260 Simpson volt-ohmmeter. The voltage of the cell which included internal resistance losses was measured with a potentiometer.

Using hydrogen as the fuel, both the platinum phosphide and the platinum electrodes were tested. The electrolyte was 5 N sulfuric acid maintained at a temperature of about 23° C. The following table indicates the results obtained:

TABLE II

| Electrode, current, ma | IR[1] free potentials, volt | | | |
|---|---|---|---|---|
| | 0.4 | 0.5 | 0.6 | 0.7 |
| PtP₂ | 270 | 185 | 80 | 30 |
| Pt | 225 | 185 | 115 | 55 |

[1] IR-internal resistance.

The rate of oxygen flow was 0.74 ml. per second; hydrogen flow was 1.7 ml. per second.

Ethylene was then used as a fuel at a flow rate of 1.2 ml. per second, the electrolyte was 5 N sulfuric acid and a temperature of 80° C. was used. The accompanying figure indicates the results with a platinum phosphide or platinum gas diffusion electrode, prepared as described previously. The solid lines indicate the results for platinum, while the broken lines indicate the results for platinum phosphide. The cell potential results show the relatively equal performance of platinum and platinum phosphide; the ethylene anode results indicate that the anodic polarization of the two electrodes are about the same and that they are performing about equally.

The platinum phosphide electrode, which approximately equals and in some instances is superior to the performance of platinum, while having only one-third the amount of platinum per unit volume, provides a significant reduction in cost and greatly enhances the efficiency of the use of platinum in fuel cells.

As will be evident to those skilled in the art, various modifications on this invention can be made or followed, in the light of the foregoing disclosure and discussion, without departing from the spirit or scope of the disclosure or from the scope of the following claims.

I claim:

1. A fuel cell for the direct production of electrical energy from a fuel comprising separate compartments housing an anode electrode and a cathode electrode, each of the electrodes immersed in an electrolyte, wherein at least one of the electrodes has platinum phosphide as its electrocatalyst.

2. A fuel cell according to claim 1, wherein said platinum phosphide is prepared by combining in an inert atmosphere at a temperature in the range of 650° to 1000° C., aluminum, phosphorus and platinum in a molar ratio of 4:6:1.

cooling the resulting melt to solidification, extracting the resultant solid with a strong mineral acid at a temperature in the range of 75° to 135° C. for a time sufficient to extract substantially all of the aluminum and excess phosphorus, and isolating the resulting high surface area platinum phosphide having a surface area as determined by a krypton adsorption apparatus of about 0.24 m.²/g. ±20%.

3. A method for preparing high surface area platinum phosphide which comprises combining in an inert atmosphere at a temperature in the range of 650° to 1000° C., aluminum, phosphorus and platinum in a molar ratio of 4:6:1, cooling the resulting melt to solidification, extracting the resultant solid with a strong mineral acid at a temperature in the range of 75° to 135° C. for a time sufficient to extract substantially all of the aluminum and excess phosphorus, and isolating the resulting high surface area platinum phosphide.

References Cited

UNITED STATES PATENTS 2,921,110  1/1960  Crowley et al. ____ 136—120 X

WINSTON A. DOUGLAS, *Primary Examiner.*

O. CRUTCHFIELD, *Assistant Examiner.*

U.S. Cl. X.R.

23—204; 136—120; 252—437